US 9,536,316 B2

(12) United States Patent
Park et al.

(10) Patent No.: US 9,536,316 B2
(45) Date of Patent: Jan. 3, 2017

(54) APPARATUS AND METHOD FOR LESION SEGMENTATION AND DETECTION IN MEDICAL IMAGES

(71) Applicants: Samsung Electronics Co., Ltd., Suwon-si (KR); Seoul National University R&DB Foundation, Seoul (KR)

(72) Inventors: Moon-Ho Park, Hwaseong-si (KR); Myung-Eun Lee, Seoul (KR); Ye-Hoon Kim, Seoul (KR); Jong-Hyo Kim, Seoul (KR); Jung-Hoe Kim, Seongnam-si (KR); Yeong-Kyeong Seong, Yongin-si (KR); Sin-Sang Yu, Seoul (KR); Baek-Hwan Cho, Seoul (KR); Hyeong-Min Jin, Seoul (KR)

(73) Assignees: Samsung Electronics Co., Ltd., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 90 days.

(21) Appl. No.: 14/188,966

(22) Filed: Feb. 25, 2014

(65) Prior Publication Data
US 2014/0241606 A1  Aug. 28, 2014

(30) Foreign Application Priority Data
Feb. 25, 2013 (KR) .................. 10-2013-0019930

(51) Int. Cl.
*G06T 7/00* (2006.01)

(52) U.S. Cl.
CPC ... *G06T 7/0081* (2013.01); *G06T 2207/30096* (2013.01)

(58) Field of Classification Search
CPC .. G06K 2009/366; G06K 9/34; G06K 9/4638; G06T 2207/30096
See application file for complete search history.

(56) References Cited

U.S. PATENT DOCUMENTS

| 7,773,786 | B2 | 8/2010 | Fidrich et al. | |
| 2006/0064396 | A1* | 3/2006 | Wei | A61B 6/463 |
| 2006/0120608 | A1* | 6/2006 | Luo | A61B 8/0825 382/224 |
| 2009/0124907 | A1* | 5/2009 | Bruce | A61B 8/481 600/458 |
| 2009/0306507 | A1* | 12/2009 | Hyun | A61B 8/08 600/443 |

(Continued)

FOREIGN PATENT DOCUMENTS

| JP | 2011-224117 A | 11/2011 |
| KR | 10-2007-0110855 A | 11/2007 |

(Continued)

*Primary Examiner* — Siamak Harandi
(74) *Attorney, Agent, or Firm* — Jefferson IP Law, LLP

(57) ABSTRACT

An apparatus and method are provided including a first segmenter and a second segmenter. The first segmenter is configured to generate a first segmentation result from a medical image using a first segmentation parameter for a candidate lesion. The second segmenter is configured to determine a target lesion to segment from among the candidate lesion based on the first segmentation result, and generate a second segmentation result using a second segmentation parameter to segment the target lesion.

13 Claims, 9 Drawing Sheets

(56) References Cited

U.S. PATENT DOCUMENTS

| | | | |
|---|---|---|---|
| 2011/0026788 A1* | 2/2011 | Elter | G06T 7/0012 382/128 |
| 2012/0070055 A1* | 3/2012 | Liu | G06T 7/0016 382/131 |
| 2014/0013219 A1* | 1/2014 | Liu | G06F 17/2881 715/255 |
| 2014/0241606 A1* | 8/2014 | Park | G06T 7/0081 382/131 |

FOREIGN PATENT DOCUMENTS

| | | |
|---|---|---|
| KR | 10-1017611 B1 | 2/2011 |
| KR | 10-2011-0130288 A | 12/2011 |

* cited by examiner

APPARATUS AND METHOD FOR LESION SEGMENTATION AND DETECTION IN MEDICAL IMAGES

CROSS-REFERENCE TO RELATED APPLICATION(S)

This application claims the benefit under 35 U.S.C. §119(a) of a Korean Patent Application No. 10-2013-0019930, filed on Feb. 25, 2013, in the Korean Intellectual Property Office, the entire disclosure of which is incorporated herein by references for all purposes.

BACKGROUND

1. Field

The following description relates to an apparatus and method to segment a lesion in a medical image.

2. Description of Related Art

A Computer Aided Diagnosis (CAD) system is used to detect and diagnose a lesion from an enormous amount of medical images. The CAD system segments a medical image including a region suspected to include a lesion, and provides a user with information about the lesion region and a location thereof. If the lesion segmentation information provided by the CAD system does not conform to criterion discrimination defined by the user, the user ignores the lesion segmentation, and manually segments again the region suspected to include the lesion. In this case, a point-based segmentation method to segment a lesion region by moving control points in a medical image is usually utilized. However, the point-based segmentation method requires a user to manually move control points. In addition, this method highly depends on the subjective criterion of the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative example, there is provided an apparatus, including a first segmenter configured to generate a first segmentation result from a medical image using a first segmentation parameter for a candidate lesion; and a second segmenter configured to determine a target lesion to segment from among the candidate lesion based on the first segmentation result, and generate a second segmentation result using a second segmentation parameter to segment the target lesion.

The first segmenter may generate a candidate lesion list including the candidate lesion based on examination information of the medical image.

The examination information may include at least one of a name and a purpose of an examination to be conducted using the medical image.

The second segmenter may be further configured to determine conformity between a lesion on the candidate lesion list and the examination information based on the first segmentation result, and determines the target lesion for segmentation according to a result of the determination.

The second segmenter may be further configured to determine conformity between a lesion on the candidate lesion list and the examination information based on information input from a user and the first segmentation result.

Each of the first segmentation parameter and the second segmentation parameter may include at least one of a slope term, a region term, and a filtering term, wherein the slope term is an amount of stress in a slope in a medical image, the region term distinguishes a lesion region from a non-lesion region, and the filtering term indicates an amount of white noise to be removed from the surroundings of a surface.

The first segmentation parameter may include a set of at least one of the slope term, the region term, and the filtering term for the candidate lesion.

The second segmentation parameter may include subdivided sets defined by adjusting a value of at least one of the slope term, the region term, and the filtering term.

In response to receipt of adjustment information of at least one of the subdivided sets based on the first segmentation result, the second segmenter may be further configured to adjust at least one of the slope term, the region term, and the filtering term based on the adjustment information.

The apparatus may also include a result provider configured to output the second lesion segmentation result based on ranking information thereof.

In accordance with an illustrative example, there is provided a method, including generating a first segmentation result from a medical image using a first segmentation parameter for a candidate lesion; determining a target lesion to segment from among the candidate lesion based on the first segmentation result; and generate a second segmentation result using a second segmentation parameter to segment the target lesion.

The obtaining of the first segmentation result may include generating a candidate lesion list that includes the candidate lesion based on examination information of the medical image.

The examination information may include at least one of a name and a purpose of an examination to be conducted using the medical image.

The determining the target lesion for segmentation may include determining conformity between a lesion on the candidate lesion list and the examination information based on the first segmentation result; and determining the target lesion to segment according to a result of the determination.

The extent that then lesion on the candidate lesion list may conform to the examination information is determined based on information from a user and the first segmentation result provided to the user.

Each of the first segmentation parameter and the second segmentation parameter may include at least one of a slope term, a region term, and a filtering term, wherein the slope term is an amount of stress in a slope in a medical image, the region term distinguishes a lesion region from a non-lesion region, and the filtering term indicates an amount of white noise to be removed from the surroundings of a surface.

The first segmentation parameter may include a set of at least one of the slope term, the region term, and the filtering term for the candidate lesion.

The second segmentation parameter may include subdivided sets defined by adjusting a value of at least one of the slope term, the region term, and the filtering term.

The obtaining of the second segmentation result may include, in response to receipt of user adjustment information for at least one of the subdivided sets based on the first lesion segmentation result, adjusting at least one of the slope term, the region term, and the filtering term based on the user adjustment information.

The method may also include providing a user with the second segmentation result based on ranking information thereof.

In accordance with an illustrative example, there is provided an apparatus, including a first segmenter configured to generate a first segmentation result using a first segmentation parameter of a candidate lesion on an image detected based on examination information; and a second segmenter configured to determine the candidate lesion as a target lesion conforming to the examination information based on the first segmentation result, and generate a second segmentation result using a second segmentation parameter to segment the target lesion.

The second segmentation parameter may be used as learning data when setting another first segmentation parameter or another second segmentation parameter for an additional lesion segmentation.

The first segmentation parameter may include at least one slope term to stress a slope in the image, a region term to distinguish as a lesion region from a non-lesion region, and a filtering term to remove noise in surroundings of a surface of the candidate lesion suspected to include a lesion.

The second segmentation parameter may include subdivided sets defined by adjusting a value of at least one of the slope term, the region term, and the filtering term.

The apparatus may also include a result provider configured to output the second segmentation result based on ranking information thereof.

Other features and aspects may be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
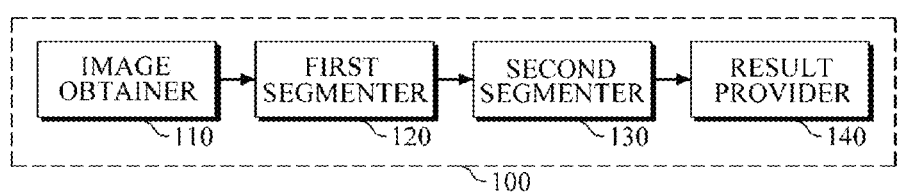
FIG. 1 is a block diagram illustrating an example of a lesion segmentation apparatus, according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a lesion segmentation apparatus and method are described in detail with embodiments with reference to relevant drawings.

FIG. 1 is a block diagram illustrating an example of a lesion segmentation apparatus, in accord with an embodiment. A lesion segmentation apparatus 100 may be a module that constitutes a Computer Aided Diagnosis (CAD) system.

Referring to FIG. 1, the lesion segmentation apparatus 100 includes an image obtainer 110, a first segmenter 120, a second segmenter 130, and a result provider 140.

The image obtainer 110 receives a captured medical image from a medical image capturing device. The medical image capturing device may be an ultrasonic measuring device, a Magnetic Resonance Imaging (MRI) device, or a Computed Tomography (CT) device, which captures an image of an organ or body part to be examined of a patient by generating the captured image into an electronic signal and converting the electronic signal into image data. The medical image capturing device transmits the converted image data to the lesion segmentation apparatus 100 in real time. In addition, the medical image capturing device may be a system, such as a Picture Archiving Communication System (PACS), which is designed to store images captured by the above-described medical image capturing devices. In one illustrative example, an image stored in PACS is transmitted to the lesion segmentation apparatus 100 for lesion segmentation.

The image obtainer 110 receives a medical image and transmits the image to the first segmenter 120. The first segmenter 120 generates a candidate lesion list, including one or more candidate lesions of the medical image including a region suspected to include a lesion. The first segmenter 120 collects examination information, including, but not limited to, a name associated with the medical image, such as, a liver cancer examination or a colorectal cancer examination, purpose of acquiring the medical image, such as, surgery or a general health check-up, or analysis to be performed of the medical image. Then, the first segmenter 120 determines at least one candidate lesion based on the examination information to generate the candidate lesion list.

For example, in response to a doctor directing the lesion segmentation apparatus 100 to run a diagnostic test to determine presence or absence of liver cancer as a general health check-up, the first segmenter 120 extracts examination information from the medical image and stores the examination information in a database. In one illustrative example, the database may be included in a Computer Aided Diagnosis (CAD) system, in one of various structural devices of the lesion segmentation apparatus 100, or the first segmenter 120.

The first segmenter 120, based on the extracted examination information, determines that the patient wants to undergo the diagnostic test for liver cancer as part of a general health check-up. Thus, the first segmenter 120 determines various liver-related lesions as candidate lesions. For example, apart from liver cancer, the first segmenter 120 determines hemangioma or cysts as candidate lesions, and then generates a candidate lesion list for the first lesion segmentation.

In addition, after generating the candidate lesion list including one or more candidate lesions, the first segmenter 120 obtains one or more first lesion segmentation results from the medical image based on a predetermined first segmentation parameter for each candidate lesion included in the candidate lesion list.

In one illustrative example, the first segmentation parameter includes at least one slope term to stress a slope in the medical image, a region term to distinguish a lesion region from a non-lesion region, and a filtering term to remove effects from noise in the surroundings of a surface of, for example, a region suspected to include a lesion. In the alternative, the surface may encompass an entire surface of the medical image. The slope term is used to adjust a surface model to move toward a boundary of the region suspected to include the lesion in the medical image using a slope vector field, helping a surface of the region to move closer to an edge of the lesion. The region term employs Gaussian probability density function of an inside and an outside of the surface when an initial surface is expanded or reduced. The filtering term makes a boundary of the surface of the region smooth, and removes various noises from the surrounding area of the lesion.

The above-described terms are merely exemplary, and thus, other various terms may be selectively added. Other terms may be selectively added to the segmentation parameter for lesion segmentation.

The first segmentation parameter may include a value set that is configured to have representative values of a slope term, a region term, and a filtering term for each candidate lesion. A value in each term of the first segmentation parameter may be a probability value. A sum of values in all of the terms of the first segmentation parameter becomes 1, as shown in the following Equation.

Segmentation Parameter=$S1+S2+S3=1$

In the above Equation, S1 denotes a slope term, S2 denotes a region term, and S3 denotes a filtering term.

As shown in the following Table 1, a first segmentation parameter may be a parameter in which values of S1, S2 and S3 are defined as representative values for each candidate lesion and are stored in a database (not shown) for first lesion segmentation. In addition, a representative value of each term of the first segmentation parameter may be determined by analyzing data accumulated through pre-processing or diagnoses of other patients.

TABLE 1

| Candidate Lesion | Slope term(S1) | Region term(S2) | Filtering term(S3) |
| --- | --- | --- | --- |
| Cyst | 0.5 | 0.3 | 0.2 |
| Hemangioma | 0.3 | 0.2 | 0.5 |
| Liver Cancer | 0.4 | 0.3 | 0.3 |

As shown in Table 1, a different weight value is assigned to each term of a first segmentation parameter according to characteristics of each candidate lesion. In one example, the first segmenter 120 obtains a first lesion segmentation result for each candidate lesion, which is different from another candidate lesion. The first lesion segmentation result is obtained by applying to the segmentation algorithm, a first segmentation parameter in which each term is assigned with a different weight value. Herein, the segmentation algorithm is not limited to a specific one, but general and various medical-image-lesion segmentation algorithms may be used.

Referring to FIG. 1, the second segmenter 130 determines at least one target lesion for segmentation among all the candidate lesions, based on the first lesion segmentation results obtained at the first segmenter 120. In one example, the target lesion for segmentation is a lesion determined to be most similar to an actual lesion.

The second segmenter 130 determines a target lesion for segmentation based on input information from a user or a doctor. For instance, the doctor may analyze a first lesion segmentation result received from the first segmenter 120 for each candidate lesion, and then select at least one candidate lesion for which second lesion segmentation is to be performed. Then, the second segmenter 130 may determine the selected at least one candidate lesion as a target lesion for segmentation. Alternatively, based on the first lesion segmentation results, the doctor may input information indicative of whether candidate lesion conforms to examination information. In this case, the second segmenter 130 determines a ranking of each candidate lesion based on the user input information, and determines one or more candidate lesions in ascending or descending order of the rankings.

In another example, dynamically or without doctor intervention, the second segmenter 130 determines how much each candidate lesion conforms to the examination information based on the first lesion segmentation result and according to a predefined discrimination criterion and outputs a determination result indicative thereof. The second segmenter 130 also determines a target lesion to segment according to the determination result.

For example, the second segmenter 130 analyzes features, such as a shape and a form, of a lesion according to the first lesion segmentation results, and compares the analysis result with pre-stored primary features of each candidate lesions. In response to the comparison result showing that a specific lesion corresponds more to a cyst than to a hemangioma or liver cancer, the second segmenter 130 determines the cyst to be a lesion subject to segmentation.

In addition, based on examination information, different weight values may be assigned to each candidate lesion. In this case, a comparison result of features and weight values assigned to each candidate lesion may be taken into consideration to determine a target lesion for segmentation. For example, in response to a diagnostic test for liver cancer being conducted in preparation for surgery, a region suspected of being liver cancer needs to be sophistically segmented for analysis and, thus, a higher weight value may be assigned to liver cancer. In this case, due to the high weight value assigned, liver cancer may be determined as a target lesion for segmentation, even if a cyst has the highest correspondence rate according to the comparison result of features.

In response to the target lesion to segment being determined, the second segmenter 130 performs a second segmentation on the target lesion by applying a second parameter in a segmentation algorithm and output one or more second lesion segmentation results. Similar to the first segmentation parameter, the second segmentation parameter may include at least one of a slope term, a region term and a filtering term.

Also, the second segmentation parameter may include one or more subdivided sets, each set is predetermined by adjusting a value of at least one of the slope term, the region term, and the filtering term to improve accuracy in the segmentation of a candidate lesion.

TABLE 2

| Ranking | Slope term | Region term | Filtering term |
|---|---|---|---|
| 1 | 0.5 | 0.3 | 0.2 |
| 2 | 0.4 | 0.3 | 0.3 |
| 3 | 0.3 | 0.3 | 0.4 |

Table 2 demonstrates an example of a second segmentation parameter that includes three sets for one target lesion, for instance, liver cancer, for segmentation. Table 2 provides three sets of terms, which are given by reducing weight values in the slope term while sequentially increasing the weight values in the filtering term to obtain different second lesion segmentation results. In Table 2, each set includes ranking information. The ranking information of each set may be used as order information when the result provider 140 provides the doctor with second lesion segmentation results. However, it is merely exemplary, and each set does not necessarily include ranking information in a second segmentation parameter.

Furthermore, the doctor may input information of at least one set for the target lesion for segmentation by analyzing the first segmentation results, or may adjust a value of each term of a plurality of sets. In one example, the second segmenter 130 adjusts values in the slope term, the region term, and the filtering term based on the input information or adjustment information. The second segmenter 130 then performs second segmentation using a second segmentation parameter that reflects the adjustment.

In another embodiment, the lesion segmentation apparatus 100 may further include an interface unit (not shown) to provide more convenience to the doctor to input or adjusting a value in each term. For example, the doctor may input or adjust a value in each term more conveniently through an interface of a jog shuttle or any other device connected to the lesion segmentation apparatus 100.

After the second lesion segmentation results are obtained at the second segmenter 130, the result provider 140 outputs the second lesion segmentation results to the doctor. In this case, in response to ranking information regarding a plurality of sets existing, as described above, the second segmenter 140 sequentially displays the second lesion segmentation results corresponding to the plurality of sets on a screen in accord with the ranking information. However, the ranking information is optionally present, and the result provider 140 may output the second lesion segmentation results according to various kinds of different criterion. For example, the result provider 140 may selectively provide one or more second lesion segmentation results according to user selection or selection from the doctor.

Furthermore, the second segmentation parameter used in the second lesion segmentation may be used as learning data when setting a first segmentation parameter or a second segmentation parameter for an additional lesion segmentation. For example, if one set among the sets that constitute the second segmentation parameter is determined to lead to an optimized segmentation result, the determined set may be updated as pre-established learning data. For this process, the lesion segmentation apparatus 100 may further include a learning data updater (not shown). If a second lesion segmentation result is obtained, the learning data updater (not shown) may inquire as to whether to update, as learning data, a second segmentation parameter used in the second segmentation, and as to which set of the second segmentation parameter is to be updated. The learning data updater may update learning data. Alternatively, in response to being connected to an external learning value judgment module, the learning data updater may transmit the second segmentation parameter and update learning data according to a judgment of the learning value judgment module.

Although the image obtainer 110, the first segmenter 120, the second segmenter 130, and the result provider 140 are described as separate structural devices, the image obtainer 110, the first segmenter 120, the second segmenter 130, and the result provider 140 may be combined as a single structural device. In the alternative, the first segmenter 120 and the second segmenter 130 may be formed or combined as a single structural device.

Also, although the lesion segmentation apparatus 100 is shown in FIG. 1 to include the image obtainer 110 and the result provider 140, these elements may be external to the lesion segmentation apparatus 100. In this configuration, the lesion segmentation apparatus 100 would include the first segmenter 120 and the second segmenter 130 as separate structural devices or a combined structural device.

Figure 3A:
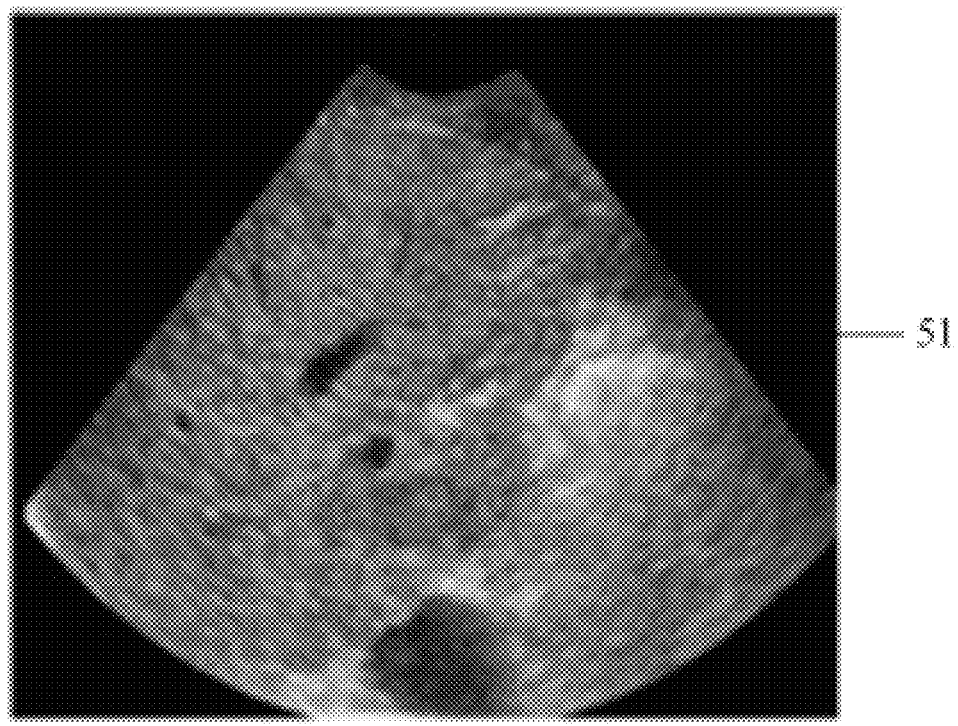
FIGS. 3A to 3B are diagrams illustrating examples of a second lesion segmentation result.
Figure 3B:
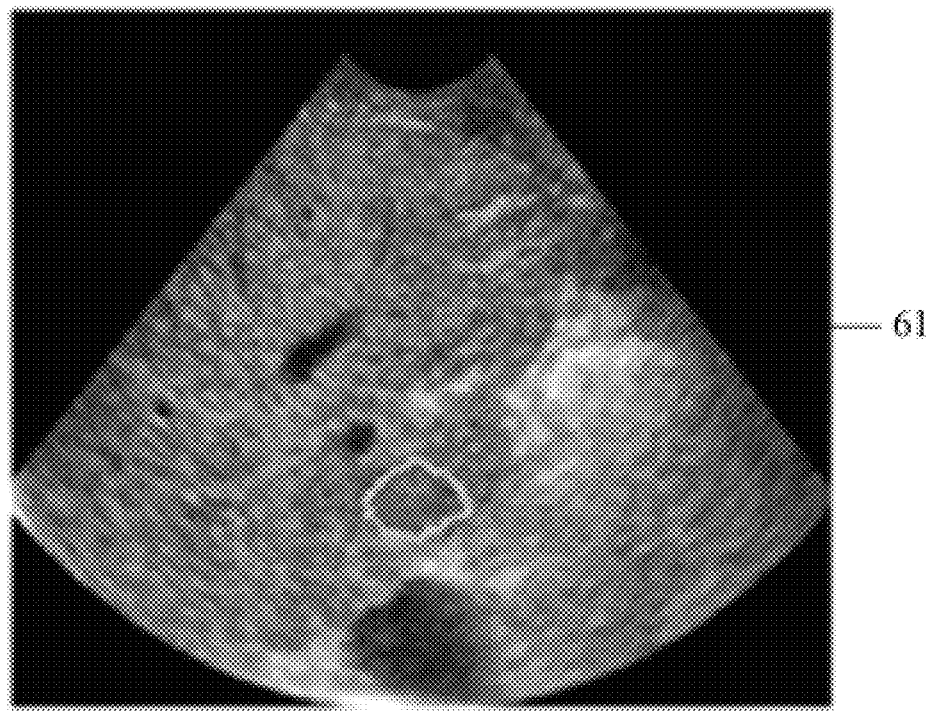
Figure 4:
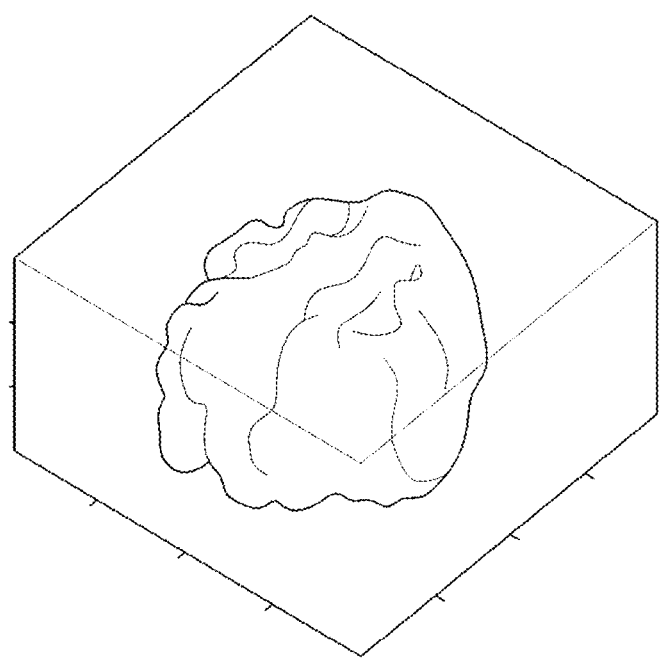
FIG. 4 is an example of volume data of a second lesion segmentation result.

FIGS. 2A to 2D are diagrams illustrating examples of a first lesion segmentation result. FIGS. 3A and 3B are diagrams illustrating examples of a second lesion segmentation result. FIG. 4 is a diagram illustrating an example of volume data of the second lesion segmentation result.

Figure 2A:
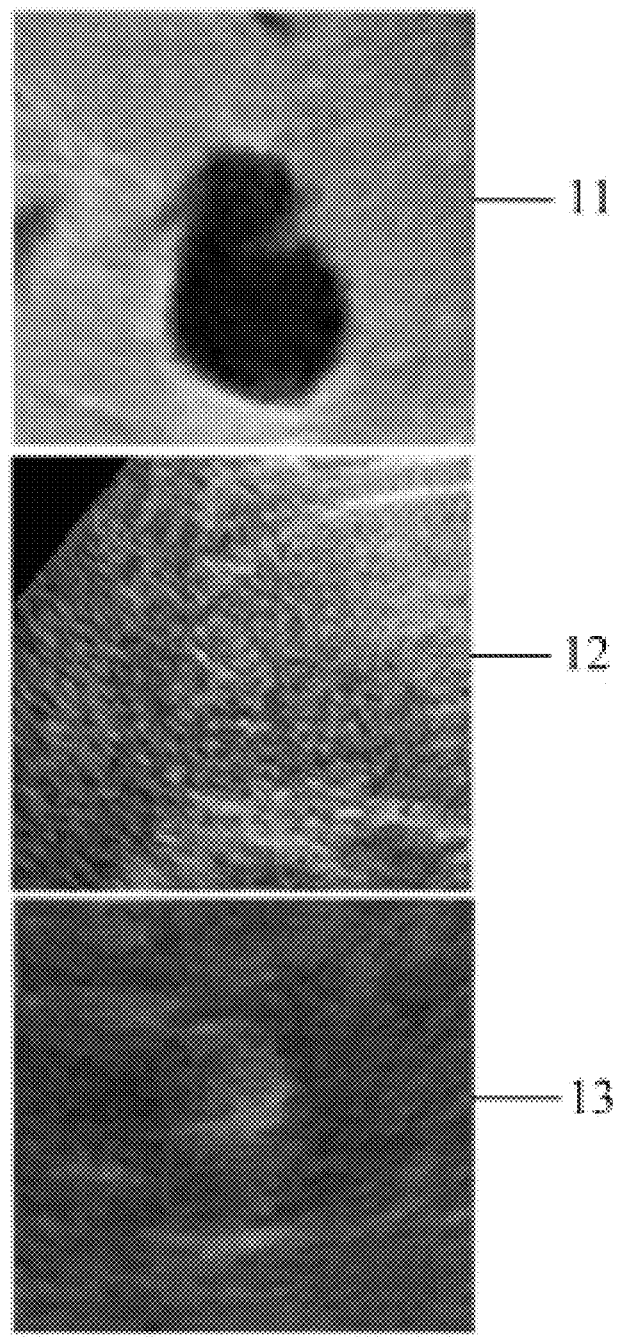
FIGS. 2A to 2D are diagram illustrating examples of a first lesion segmentation result.

FIG. 2A shows an example of a lesion in a medical image, which is segmented manually by a user or a doctor with respect to candidate lesions, for example, cyst 11, hemangioma 12, and liver cancer 13. Normally, candidate lesions are determined based on examination information, and the doctor manually analyzes the medical image to analyze the candidate lesions.

Figure 2B:
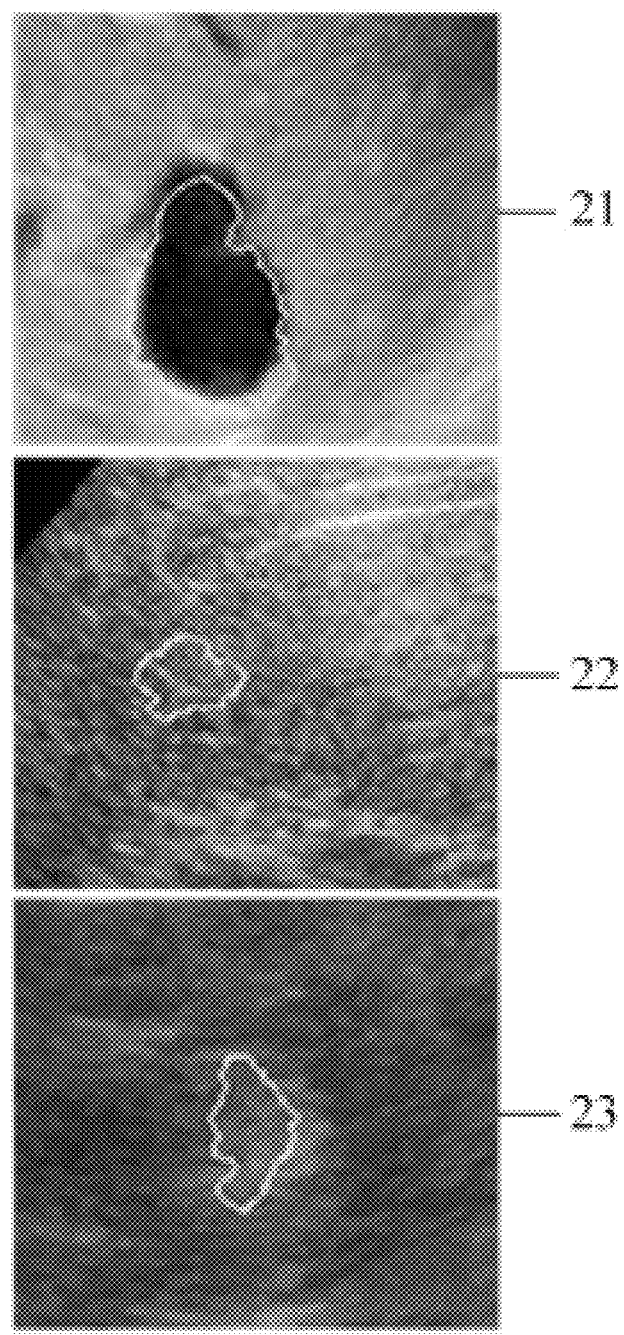

FIG. 2B shows an example of a first lesion segmentation result where the first segmenter 120 determines three candidate lesions including a lesion cyst 21, hemangioma 22, and liver cancer 23, based on examination information. The first segmenter 120 obtains first lesion segmentation results using a first segmentation parameter for each of the candidate lesions. For convenience of explanation, the first lesion segmentation result for a candidate lesion, shown in FIG. 2B, is obtained by stressing a slope term, that is, by assigning a greatest weight value to the slope term. Assuming that the first lesion segmentation results in FIG. 2A are more accurate than those in FIG. 2B, it may be understood and appreciated that the first lesion segmentation results in FIG. 2B are under-segmentation results compared to those shown in FIG. 2A because the segmentation results of the hemangioma 22 and the liver cancer 23 have obscure edges.

Figure 2C:
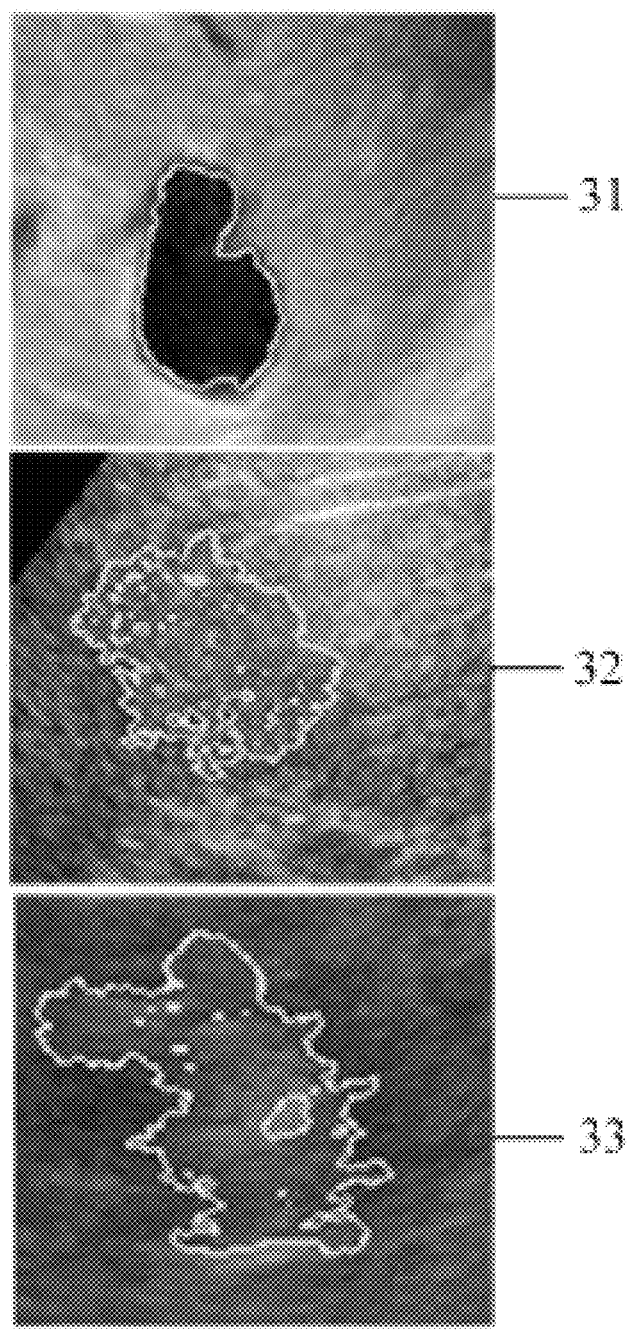

FIG. 2C shows an example of first lesion segmentation results obtained by the first segmenter 120 using a first segmentation parameter of which a region term is assigned a greatest weight value using a probability density function for the inside and outside of a surface with respect to cyst 31, hemangioma 32, and liver cancer 33. The segmentation results regarding the hemangioma 22 and the liver cancer 23, shown in FIG. 2C, are over-segmentation results in which not only a lesion region, but also a surrounding lesion, with a brightness level similar to that of the lesion region are segmented.

Figure 2D:
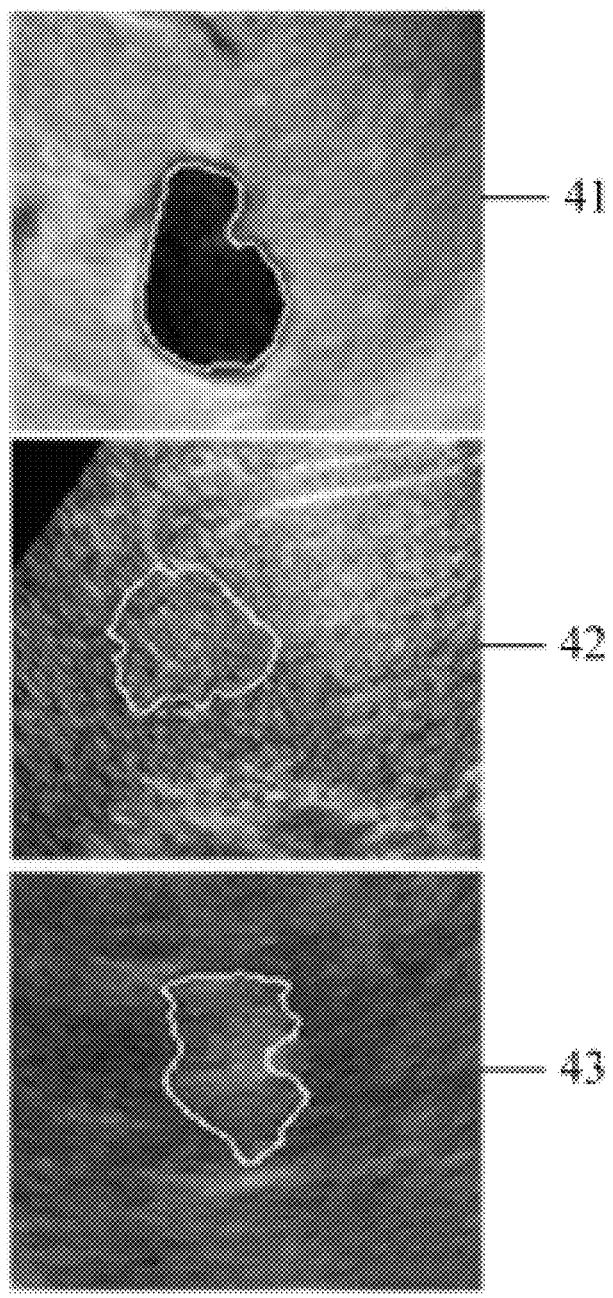

Similarly, as shown in FIG. 2D, in response to segmentation being performed with respect to cyst 41, hemangioma 42, and liver cancer 43 using a first segmentation parameter, of which a filtering term is assigned a greatest weight value, the first segmenter 140 may obtain first lesion segmentation results in which a boundary line appears smoother compared to FIG. 2B or FIG. 2C.

As such, if any term is assigned a greatest weight value, it is hard to obtain an optimized segmentation result. Thus, in one embodiment, a first segmentation parameter is set in advance by assigning a weight value to a term optimized for each candidate lesion, as shown in the above Table 1. Then, by applying the first segmentation parameter in a segmentation algorithm, accurate first lesion segmentation results may be obtained.

FIG. 3A is a diagram illustrating an example of a second lesion segmentation result that is obtained after the doctor determines liver cancer 51 to be a target lesion for segmentation among a cyst, hemangioma, and liver cancer, and then manually segments the lesion. FIG. 3B is a diagram illustrating an example of a second lesion segmentation result obtained after the second segmenter determines liver cancer 61 as a segmentation subject lesion, and performs second segmentation of the lesion using a set with the highest ranking among a plurality of sets of the second segmentation parameter, as shown in Table 2.

The segmentation result in FIG. 3B is similar to that of FIG. 3A, which is obtained through manual operation. As described above, the doctor is enabled to adjust a value in each term of a plurality of sets of the second segmentation parameter based on a first lesion segmentation result producing an accurate lesion segmentation result.

As shown in FIG. 3B, in response to a second lesion segmentation result of a received medical image being obtained by the second segmenter 130, the result provider 140 generates volume data of a segmented lesion region based on the second lesion segmentation result. In addition, as shown in FIG. 4, the result provider 140 displays the generated volume data as three-dimensional (3D) coordinates.

In addition, in response to a request from the doctor, the result provider 140 displays on a screen second lesion segmentation results obtained using different sets of the second segmentation parameter randomly or sequentially according to a predetermined criterion, such as an input order.

Figure 5:
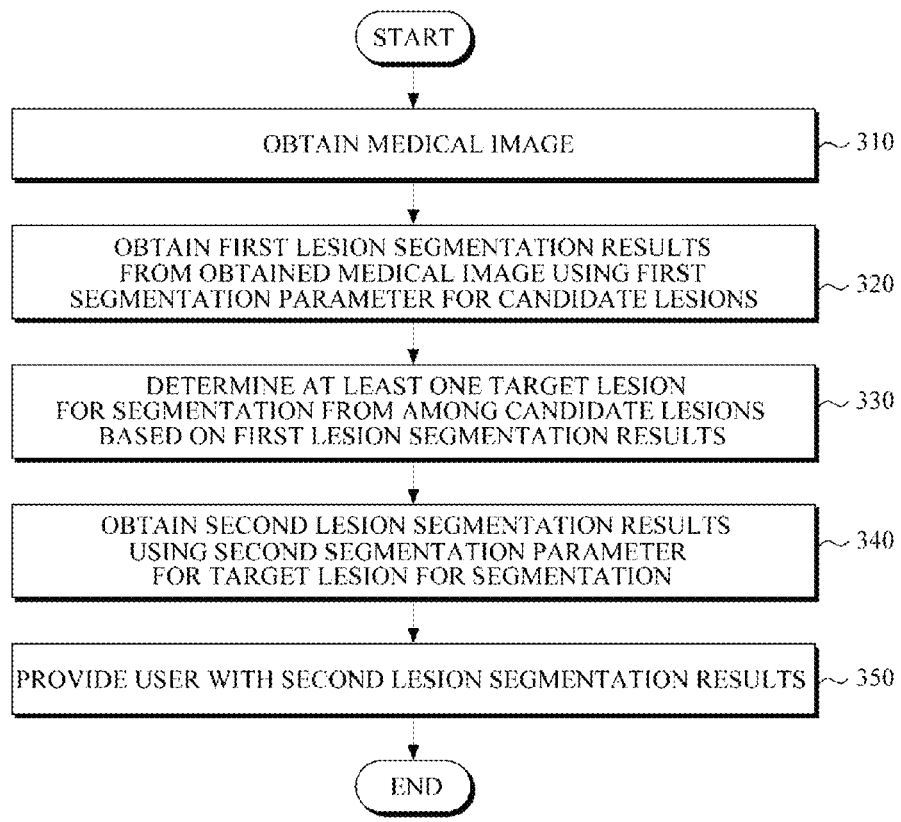
FIG. 5 is a flow chart illustrating an example of a lesion segmentation method, according to an embodiment.

FIG. 5 is a flow chart illustrating an example of a lesion segmentation method, according to an embodiment. The lesion segmentation method in FIG. 5 may be implemented using the lesion segmentation apparatus 100 shown in FIG. 1. As functions of the lesion segmentation apparatus 100 have been described in detail above with reference to FIGS. 1 to 4, they will be succinctly explained thereof to avoid repetitive explanations.

Referring to FIG. 5, at operation 310, the method obtains a medical image from a medical image capturing device. The medical image may be received from the medical image capturing device in real time. The method determines one or more candidate lesions with respect to each medical image based on examination information and generates a candidate lesion list that includes the determined one or more candidate lesions.

Then, at operation 320, the method obtains a first lesion segmentation result for each candidate lesion using a first segmentation parameter of the medical image. As shown Table 1, the first segmentation parameter may be a set of terms, such as, a slope term, a region term, and a filtering term, which is determined by assigning an optimized value to each term of a corresponding candidate lesion.

In response to the first lesion segmentation result being obtained, at operation 330, the method determines at least one target lesion for segmentations among the candidate lesions based on the first lesion segmentation result. The target lesion for segmentation may conform more to the examination information than any other candidate lesions, and the method may determine the target lesion for segmentation based on user input information or according to a preset criterion of discrimination.

For example, as described above, a user or a doctor may select one or more target lesion for segmentations based on a first lesion segmentation result. In another example, the doctor may input information as to the extent that each candidate lesion conforms to examination information. The method determines a target lesion for segmentation based on the conformity with the information the doctor input. The method determines rankings of candidate lesions according to the extent each candidate lesion conforms to examination information. The method then determines one or more target lesion for segmentations in ascending or descending order of the rankings. In another example, the method dynamically, without user intervention, determines the extent a candidate lesion conforms to the examination information according to a preset criterion of discrimination.

In response to a target lesion for segmentation being determined, at operation 340, the method performs a second segmentation on the target lesion by applying a second segmentation parameter to a segmentation algorithm and produce one or more second lesion segmentation results. The second segmentation parameter includes one or more subdivided sets of values, each set predetermined by adjusting a value of at least one of a slope term, a region term, and filtering term, as shown in Table 2, illustrated above. The doctor is enabled to analyze the first lesion segmentation result, and either manually input a subdivided set of terms or adjust a value of each term, so that the doctor may obtain a desired result.

Then, if one or more second lesion segmentation results are obtained, at operation 350, the method provides the second lesion segmentation results to the doctor. In one example, the method outputs the second lesion segmentation results sequentially according to ranking information thereof. Alternatively, the method generates volume data based on the second lesion segmentation results of a plurality of medical images, and displays the volume data at 3D coordinates.

In the above-described embodiments, the lesion segmentation apparatus 100 and method thereof obtains accurate segmentation results without a user or a doctor manually performing segmentation. Accordingly, the segmentation results may be objective and consistent, helping to diagnose a lesion more accurately.

The image obtainer 110, the first segmenter 120, the second segmenter 130, and the result provider 140 and the lesion segmentation apparatus 100 described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

It is to be understood that in the embodiment of the present invention, the operations in FIG. 7 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIG. 5.

Program instructions to perform a method described in FIG. 5, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus, comprising:
at least one processor, configured to:
generate a candidate lesion list comprising at least one candidate lesion based on examination information, and a first segmentation result from a medical image using a first segmentation parameter for the at least one candidate lesion, the examination information comprising at least one of a name and a purpose of an examination to be conducted using the medical image; and
determine at least one target lesion to segment from among the candidate lesion list based on the first segmentation result, and generate a second segmentation result using a second segmentation parameter to segment the at least one target lesion,
wherein each of the first segmentation parameter and the second segmentation parameter comprises at least one of a slope term, a region term, and a filtering term, wherein the slope term is an amount of stress in a slop in a medical image, the region term distinguishes a lesion region from a non-lesion region, and the filtering term indicates an amount of white noise to be removed from the surroundings of a surface, and
wherein the second segmentation parameter comprises subdivided sets defined by adjusting a value of at least one of the slop term, the region term, and the filtering term.

2. The apparatus of claim 1, wherein the at least one processor is further configured to:
determine conformity between a lesion on the candidate lesion list and the examination information based on the first segmentation result, and
determine the at least one target lesion for segmentation according to a result of the determination of the conformity.

3. The apparatus of claim 2, wherein the at least one processor is further configured to determine the conformity between the lesion on the candidate lesion list and the examinationv information based on information input from a user using the first segmentation result.

4. The apparatus of claim 1, wherein the first segmentation parameter comprises a set of at least one of the slope term, the region term, and the filtering term for the at least one candidate lesion.

5. The apparatus of claim 1, wherein, in response to receipt of adjustment information of at least one of the subdivided sets, the at least one processor is further configured to adjust at least one of the slope term, the region term, and the filtering term based on the adjustment information.

6. The apparatus of claim 1,
wherein the at least one processor is further configured to output the second segmentation result on a screen based on ranking information thereof.

7. The apparatus of claim 1, wherein the second segmentation parameter is used as learning data when setting another first segmentation parameter or another second segmentation parameter for an additional lesion segmentation.

8. A method, comprising:
generating a candidate lesion list comprising at least one candidate lesion based on examination information, the examination information comprising at least one of a name and a purpose of an examination to be conducted using a medical image;
generating a first segmentation result, by at least one processor, from the medical image using a first segmentation parameter for the at least one candidate lesion;

determining at least one target lesion to segment from among the candidate lesion list based on the first segmentation result; and generating a second segmentation result using a second segmentation parameter to segment the at least one target lesion, wherein each of the first segmentation parameter and the second segmentation parameter comprises at least one of a slope term, a region term, and a filtering term, wherein the slope term is an amount of stress in a slope in a medical image, the region term distinguishes a lesion region from a non-lesion region, and the filtering term indicates an amount of white noise to be removed from the surroundings of a surface, and wherein the second segmentation parameter comprises subdivided sets defined by adjusting a value of at least one of the slope term, the region term, and the filtering term.

9. The method of claim 8, wherein the determining of the at least one target lesion for segmentation comprises:

determining conformity between a lesion on the candidate lesion list and the examination information based on the first segmentation result; and determining the at least one target lesion to segment according to a result of the determination of the conformity.

10. The method of claim 9, wherein the determining of the conformity comprises:

determining the conformity between the lesion on the candidate lesion list and the examination information based on information input from a user using the first segmentation result.

11. The method of claim 8, wherein the first segmentation parameter comprises a set of at least one of the slope term, the region term, and the filtering term for the at least one candidate lesion.

12. The method of claim 8, wherein the generating of the second segmentation result comprises, in response to receipt of user adjustment information for at least one of the subdivided sets, adjusting at least one of the slope term, the region term, and the filtering term based on the user adjustment information.

13. The apparatus of claim 8, further comprising:

providing a user with the second segmentation result based on ranking information thereof.

* * * * *